UNITED STATES PATENT OFFICE.

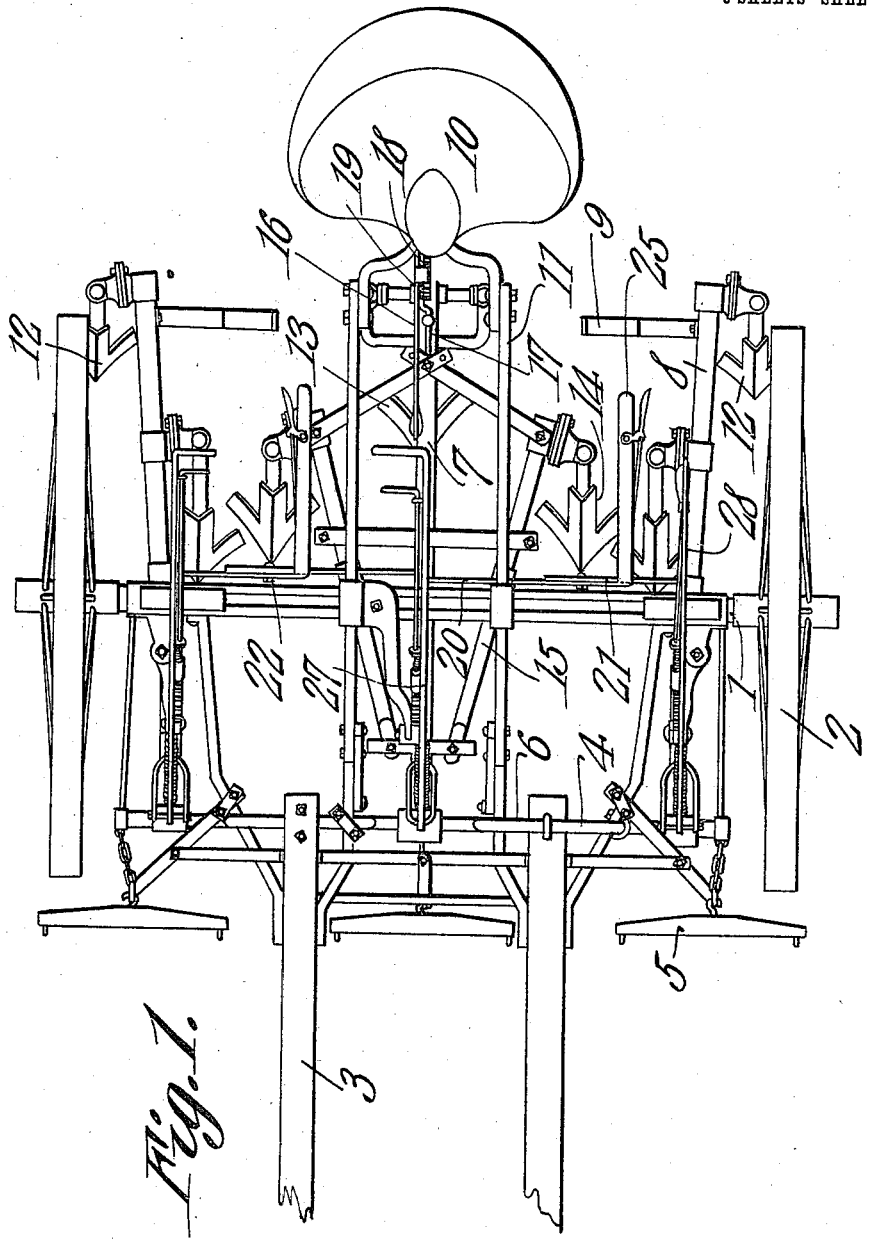

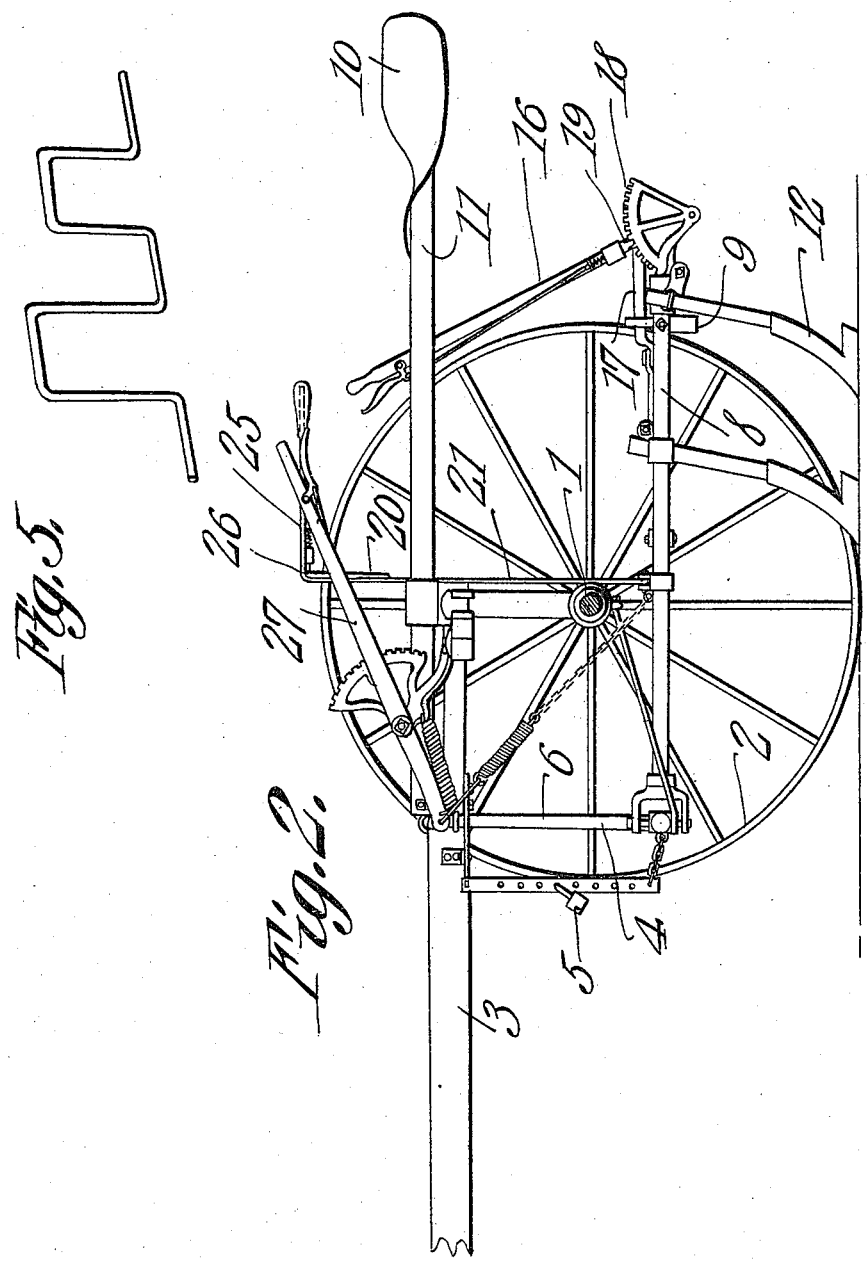

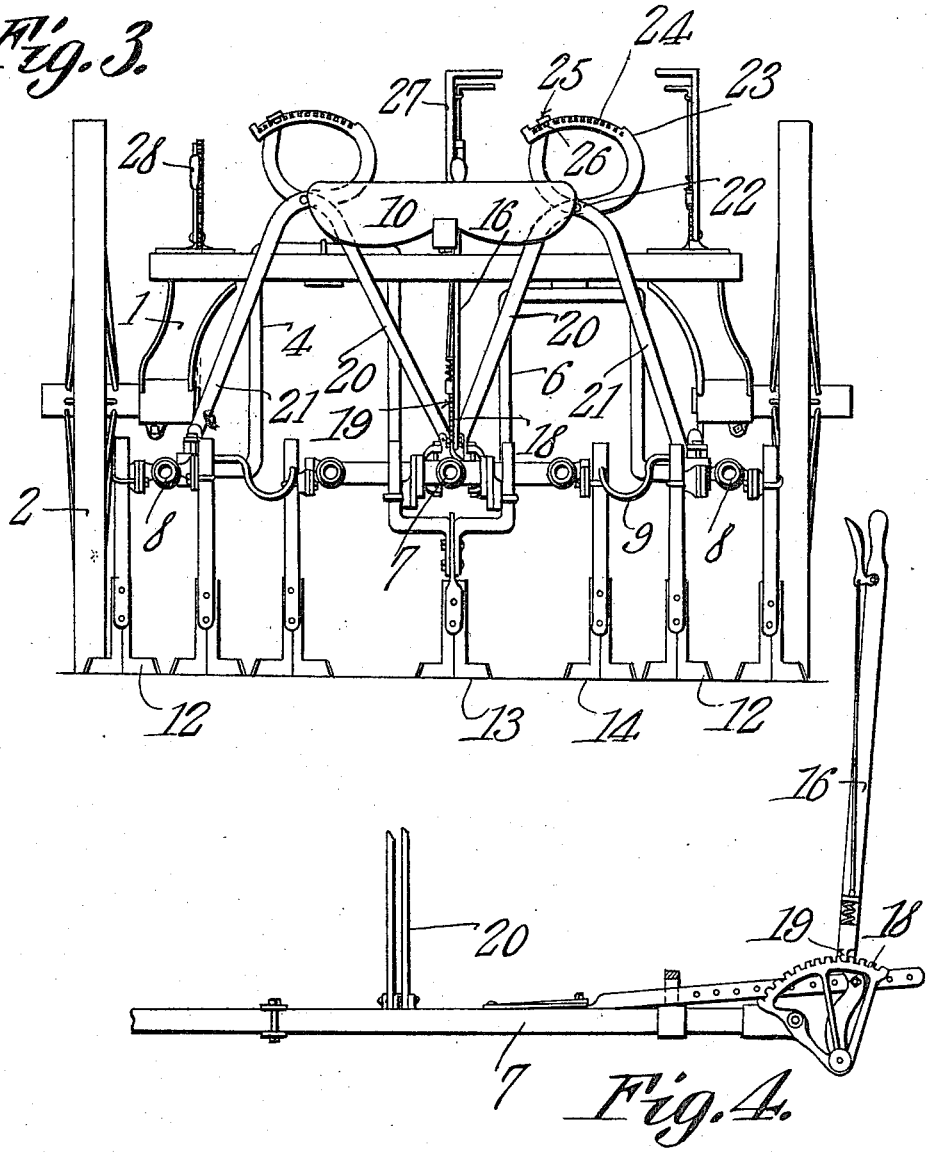

FRANK DIVIN, OF WEST, TEXAS.

CULTIVATOR.

965,376.  Specification of Letters Patent.  Patented July 26, 1910.

Application filed October 23, 1909. Serial No. 524,250.

*To all whom it may concern:*

Be it known that I, FRANK DIVIN, a citizen of the United States, residing at West, in the county of McLennan and State of Texas, have invented a new and useful Cultivator, of which the following is a specification.

This invention has relation to cultivators and it consists in the novel construction and arrangement of its parts as hereinafter shown and described.

The object of the invention is to provide a cultivator structure to which is attached a triple gang of beams with means for adjusting the side beams laterally with relation to the intermediate beam and means for adjusting the side earth engaging members mounted upon the intermediate beam in lateral directions with relation to the intermediate earth engaging member mounted upon the said intermediate beam. The frame of the cultivator includes an arch axle mounted at its ends upon supporting wheels and which is of length sufficient to straddle two rows of standing plants. Attached or located in front of said arch axle is an arch bar having duplicate arch sections, each of which is adapted to straddle one row of plants. The beams are pivotally connected with the end portions and intermediate portion of the said arch bar in the usual manner and the intermediate beam carries earth engaging members sufficient to cultivate the soil located between the rows of standing plants while the side beams carry earth engaging members sufficient to cultivate one-half of the area of the soil occurring along the outer side of the rows of plants. By this arrangement an area of soil is cultivated equivalent to the area lying between three adjacent rows of plants and by reason of the adjustment mentioned the cultivator may effectually operate upon the soil irrespective of the relative distances between the rows.

In the accompanying drawings:—Figure 1 is a top plan view of the cultivator. Fig. 2 is a vertical side elevation of the same with one wheel thereof removed. Fig. 3 is a rear elevation of the cultivator. Fig. 4 is a detailed view of means employed upon the cultivator for supporting the side earth engaging members of the intermediate beam. Fig. 5 is a detail perspective view of the arch bar forming a component part of the cultivator.

The cultivator includes an arch axle or frame 1 of sufficient length to straddle two adjacent rows of plants. The supporting wheels 2 are journaled to the ends of the axle 1 in the usual manner. Shafts 3 are fixed at their rear portions to the intermediate portions of the said axle 1 and an arch bar 4 is attached to the shafts 3 in advance of the axle 1. Swingle trees 5 are attached to the arch bar 4 in the usual manner and one of the said trees lies between the shafts 3 and a tree lies beyond the outer side of each shaft 3 in the manner as illustrated in Fig. 1 of the drawings. Thus it will be seen that provision is made for attaching three draft animals to the cultivator, one animal being adapted to travel between the shafts and the other two, one at each outer side of the shaft. Arched portions 6 are formed in the bar 4 at the opposite sides of the median line of draft of the cultivator.

An intermediate beam 7 is pivotally connected with the intermediate portion of the arch bar 4 and side beams 8 are pivotally connected with the ends of the arch bar 4 in the usual manner. Stirrups 9 are attached to the rear portions of the beams 8 and are within reach of one occupying the seat 10 which is mounted upon the bars 11 which in turn are attached at their forward ends to the shafts 3. Primary earth engaging members 12 are carried by the side beams 8 while the intermediate beam 7 carries a trinity of earth engaging members. Of the earth engaging members carried by the intermediate beam 7 the member 13 is fixed with relation to the beam and is termed the intermediate member while the side members 14 are connected with bars 15 which in turn are pivotally mounted upon the intermediate portion of the intermediate beam 7. A lever 16 is fulcrumed to the rear portion of the beam 7 and is operatively connected by means of a link 17 with the cross bars 15 at a point to one side of the pivotal connection between the said cross bars and the beam 7. Thus it will be seen that by swinging the lever 17 the cross bars 15 may be swung upon their pivots and thus the earth engaging members 14 may be moved toward or away from the vertical plane through the median longitudinal dimension of the beam 7. Thus the earth engaging members 14 may be caused to operate comparatively near or remote from the soil upon which the earth engaging member 13 operates. A segment 18 is located adjacent the lever 16 and is adapted to be engaged by a pawl 19 carried by the said lever for the purpose of holding the levers in an adjusted position. As the mechanisms 18 and 19 are of the usual pattern further description thereof is deemed unnecessary. Arms 20 are pivotally connected at their lower ends with the intermediate beam 7. Arms 21 are pivotally connected at their lower ends with the side beams 8 and the said arms 20 and 21 are pivotally connected at their upper portions as at 22. The upper ends of the arms 21 are fashioned into the segment portion 23 having gear teeth 24. The upper ends of the arms 20 are fashioned into handles 25 upon which are located spring actuated pawls 26 adapted to engage the teeth 29 upon the segment portions 23 of the arms 21. The arms 20 are inclined in outward directions while the arms 21 are inclined at their upper ends in inward directions and the handles 25 are located within convenient reach of one occupying the seat 10. A lever mechanism 27 is mounted upon the frame of the cultivator and is operatively connected with the cultivator beam 7 in the usual manner and may be used for raising or lowering the said beam 7. Levers 28 are also fulcrumed upon the frame of the cultivator and are operatively connected with the side beams 8 in the usual manner and may be swung independently and simultaneously for swinging the said beam 8 in vertical direction.

It will be seen that by disengaging one or both of the pawls 26 from one or both of the sets of teeth 24 carried by the segment portion 23 and by placing the feet in the stirrups 9 one or both of the side beams 8 may be swung laterally with relation to the intermediate beam 7 and when the said side beams 8 are properly positioned with relation to the said intermediate beam 7 the pawl mechanisms 26 are permitted to engage the teeth 24 upon the segment 23 and thus the said beams 8 will be held in adjusted positions with relation to the beam 7. Therefore it will be seen that the beams may be adjusted so as to operate upon the soil occurring between rows of plants where the space is either limited or ample and for the same reason it is desirable that the earth engaging members 14 upon the intermediate beam 7 shall be adjustably mounted with relation to the earth engaging member 13 which is fixed upon the said beam 7.

Having described my invention, what I claim as new and desire to secure by Letters Patent is—

A cultivator comprising a wheel mounted frame, a bar attached thereto and having arched portions located beyond the opposite sides of the median line of draft of the frame, a beam pivotally attached to said bar in the median line of draft of the frame and at a point between the arched portions of said bar, an earth engaging member fixed to said beam, earth engaging members pivotally connected with said beam and located at the opposite sides of the frame, bars carried by the said beam and connected with the said side earth engaging members and adapted to hold the said side earth engaging members in adjusted positions with relation to the beam, side beams pivotally connected with the end portions of said bar beyond the outer ends of the arched portions thereof, earth engaging members carried by the side beams, and means connecting the side beams with the intermediate beam and adapted to hold the side beams in adjusted positions with relation to the intermediate beam.

In testimony that I claim the foregoing as my own, I have hereto affixed my signature in the presence of two witnesses.

FRANK DIVIN.

Witnesses:
FRANK MARAK,
JOS. KADERA.